US008138706B2

(12) United States Patent  (10) Patent No.: US 8,138,706 B2
Ochsenbein et al. (45) Date of Patent: Mar. 20, 2012

(54) SAFETY DRIVE FOR A FLAP OR A VALVE

(75) Inventors: Martin Ochsenbein, Russikon (CH); Curdin Stäheli, Wetzikon (CH); Roman Furrer, Fehraltorf (CH)

(73) Assignee: Belimo Holding AG, Hinwil (CH)

( * ) Notice: Subject to any disclaimer, the term of this patent is extended or adjusted under 35 U.S.C. 154(b) by 360 days.

(21) Appl. No.: 12/302,217

(22) PCT Filed: May 2, 2007

(86) PCT No.: PCT/CH2007/000216
§ 371 (c)(1),
(2), (4) Date: Sep. 28, 2009

(87) PCT Pub. No.: WO2007/134471
PCT Pub. Date: Nov. 29, 2007

(65) Prior Publication Data
US 2010/0007301 A1 Jan. 14, 2010

(30) Foreign Application Priority Data
May 24, 2006 (CH) .................................... 0862/06

(51) Int. Cl.
G05B 9/02 (2006.01)
(52) U.S. Cl. ................. 318/563; 318/400.3; 318/504; 318/609; 318/626; 318/500
(58) Field of Classification Search ................ 318/563, 318/400.3, 504, 609, 626; 324/500, 511
See application file for complete search history.

(56) References Cited

U.S. PATENT DOCUMENTS

| 5,278,454 A | 1/1994 | Strauss et al. |
| 5,519,295 A | 5/1996 | Jatnieks |
| 5,744,876 A | 4/1998 | Fangio |

(Continued)

FOREIGN PATENT DOCUMENTS
EP 1278287 A1 1/2003

OTHER PUBLICATIONS

Chinese Office Action corresponding to Chinese Patent Application No. 200780018908.3, dated Feb. 17, 2011, English language translation.

(Continued)

*Primary Examiner* — Walter Benson
*Assistant Examiner* — David Luo
(74) *Attorney, Agent, or Firm* — Sughrue Mion, PLLC

(57) ABSTRACT

A safety drive unit (1) with a safety circuit (12) that resets a flap or a valve into a specified safety position for controlling a gas or liquid volumetric flow, in particular in the field of heating, ventilation, and monitoring systems. The safety drive unit (1) comprises an actuator (14) with a controllable electric motor (28), a capacitive energy storage unit (20), and energy converter (22) with a power module, and a power supply (18). During normal operation, the electric current in the power module of the energy converter (22) is converted to a lower voltage and stored in the capacitive energy storage unit. If the voltage drops below a predetermined value or if there is a power failure, the stored electrical charge is converted back to a higher voltage by the same power module, and the electric motor (28) is activated until the specified safety position is reached.

41 Claims, 7 Drawing Sheets

U.S. PATENT DOCUMENTS

| | | | | |
|---|---|---|---|---|
| 5,744,923 | A * | 4/1998 | Strauss et al. | 318/563 |
| 5,852,333 | A * | 12/1998 | Strojny et al. | 307/87 |
| 7,023,163 | B2 * | 4/2006 | Charles et al. | 318/563 |
| 7,068,494 | B2 * | 6/2006 | Fujino | 361/502 |
| 2005/0127854 | A1 | 6/2005 | Charles et al. | |
| 2007/0030016 | A1 | 2/2007 | Schumacher et al. | |

OTHER PUBLICATIONS

G. Jian-ming, et al., Research on Applications of Super Capacitors in DC Power Systems, Marine Electric & Electronic Technology, 2005, vol. 6, pp. 35-37.

* cited by examiner

SAFETY DRIVE FOR A FLAP OR A VALVE

TECHNICAL FIELD

The invention relates to a safety drive having a safety circuit for a flap or a valve for controlling a gas volume flow or fluid volume flow, in particular in the field of heating/venting air conditioning (HLK), fire protection and room protection, into a predefined safety position. Furthermore, the invention relates to a method for the assured return of the flap or the valve into the aforementioned safety position. The safety circuit becomes active if a voltage failure or voltage drop is detected.

PRIOR ART

In order to move a flap in a ventilating system or a valve in a water conducting system, relatively weak motors have to activate control elements which have large areas or large volumes. Precise and stable adjustment is possible with a pronounced step-down ratio. In order to pivot a flap or rotate a ball valve through an acute, right-angled or oblique angle, numerous rotations of the drive shaft of the electric motor are necessary. If a valve is displaced linearly, the same applies to a relatively small displacement.

Both in the case of a gas volume flow and in the case of a fluid volume flow it is highly important that when there is a power failure the flap and/or the valve can be returned to a predetermined safety position, generally the closed position. This has conventionally been done with a return spring which is tensioned by the electric motor when the shut-off element, which is how a flap, a valve or the like is also referred to, is activated. When there is a voltage drop, likewise of a predetermined magnitude, which is detected by a corresponding sensor, or a power failure, the electrical power feed of the electric motor is switched off. As a result, the force opposing the tensioned spring is eliminated and the return action can occur virtually immediately.

However, these spring systems which have been used for a long time always have the disadvantage that they give rise to increased wear of the mechanics and that the spring loses its tension over time.

U.S. Pat. No. 5,278,454 discloses an electric safety circuit which describes a capacitor with a high charging capacity and a small volume. The capacitor can provide the necessary return power. A simple sensor monitors the mains voltage. This capacitive energy store replaces a return spring. Instead of one capacitor, a plurality of capacitors can be connected in series and/or parallel. Connection in parallel allows the capacitance to be increased, while series connection allows the voltage to be increased. For the charging mode and motor mode, two separate power feeds with a constant voltage are used. It has a disadvantageous effect that a switch and a sensor have to be used for the voltage relay. The emergency operation in the case of a voltage drop does not permit any reliable monitoring and the charge circuit produces a considerable amount of heat.

U.S. Pat. No. 5,744,876 presents a safety drive with a safety circuit in which, in contrast to U.S. Pat. No. 5,278,454, the relay is active only in the emergency state, i.e. when there is a voltage drop or voltage failure. The return time of the control element is controlled by means of a small capacitor in combination with a transistor. However, the relay remains unstable and the voltage control does not take place while the capacitor is being discharged, and the charge circuit also produces heat here.

According to U.S. Pat. No. 5,744,923, a constant voltage can be produced with an additional voltage regulator, even in the emergency operating mode during a voltage drop in the feed voltage. Just before the stop in the predefined position, a braking effect occurs. PowerMOSFET switches can be used to obtain an increased service life compared to relay technology. However, these advantages contrast with a high-loss voltage regulator circuit, and four power supply units (voltages/voltage regulators) are also necessary.

Finally, U.S. Pat. No. 7,023,163 B2 presents a safety circuit for controlling an actuator which is fed with a rectified input voltage. The DC voltage is raised to a higher level and corresponding capacitors are charged with this voltage. As a result, it is possible to use capacitors with smaller capacitances. When there is a voltage drop in the supply current for driving the motor or when there is a power failure, the increased voltage is transformed back to a lower DC voltage and the electric motor is driven with it.

A first generally known type of circuit of a switching regulator is referred to as a so-called "step-down topology" or "step-down mode". The latter operating mode, also referred to as a buck converter topology or step-down topology, reduces the output voltage compared to the input voltage, as a result of which a capacitor is charged at the output end.

In a "step-up topology", the output voltage is raised compared to the input voltage, and the term boost converter topology or step-up converter topology is also used.

Energy converters are used in which the energy flux occurs in both directions, with the step-down topology for charging and with the step-up topology for discharging the capacitor.

SUMMARY OF THE INVENTION

The invention is based on the object of providing a safety drive of the type mentioned at the beginning and a method for operating it which have a further simplified and improved safety circuit for returning a flap or a valve.

The core of the invention comprises providing a controllable power assembly which either charges the capacitive energy store from the power feed (in a normal case) or discharges said capacitive energy store into the electric motor in order to operate the electric motor (in an emergency). This provides a particularly simple design of the control circuit and a way of controlling the energy flux in a normal case and in an emergency which is particularly simple and can be used in a flexible way.

According to one refinement of the invention, the capacitive energy store comprises at least one double-layer capacitor or supercap. In particular, the power assembly is part of an energy converter which can be operated as a DC/DC converter having a step-down switching mode which reduces the output voltage compared to the input voltage, and a step-up switching mode which increases the output voltage compared to the input voltage of the energy store or supercap, wherein the power feed is preferably connected to the electric motor via an intermediate circuit, the energy converter is connected to the intermediate circuit, a first controllable switch with a first diode which bypasses said controllable switch and a second controllable switch with a second diode which bypasses said controllable switch arranged in series within the energy converter, and a series circuit composed of the capacitive energy store and an inductor is connected between a pole of the intermediate circuit and the connecting point of the two switches.

The switches are advantageously embodied here as FET switches, preferably with integrated diodes.

Basically, the capacitive energy store can comprise a single capacitor. Preferably a monitoring unit is then assigned to the single capacitor.

Alternatively, the capacitive energy store can comprise a plurality of capacitors which are connected in series and/or parallel. In this case, a monitoring unit is assigned to a plurality of capacitors which are connected in parallel, and a monitoring and balancing unit is respectively assigned to a plurality of capacitors connected in series.

In one refinement, the monitoring unit or the monitoring and balancing unit respectively comprises a series circuit composed of a resistor and a controllable switch.

A further refinement of the invention is characterized in that the controllable switches of the energy converter or the controllable switches of the monitoring unit and/or of the monitoring and balancing units are actuated by a microcontroller.

The electric motor is preferably actuated by an actuation circuit, in particular in the form of a motor ASIC, wherein the actuation circuit is connected to a microcontroller, in particular via a MP bus.

Another refinement of the invention is characterized in that a diode, which switches off the flow of current for feeding in current when the capacitive energy store is discharged into the electric motor, is arranged in the intermediate circuit.

A sensor circuit, which is designed to detect a voltage drop in the intermediate circuit, can also be arranged in the intermediate circuit.

One refinement of the method according to the invention is characterized in that on the input side an alternating current of a frequency of preferably 50-60 Hz is transformed into direct current and is fed to the capacitive energy store via the power assembly.

The voltage range between the lower voltage potential and the higher voltage potential is at least approximately 20-40V here.

Another refinement of the method according to the invention is defined in that a microcontroller in the step-down mode measures the voltage across the capacitive energy store with an analog input, and outputs a PWM signal to a controllable switch of the power assembly via a digital output, and in that a microcontroller in the step-up mode measures the voltage at an intermediate circuit which is located between the power feed and the electric motor and has an analog input, and outputs a PWM signal to a controllable switch of the power assembly via a digital output.

A power assembly which comprises a series circuit of a first controllable switch and a first diode which bypasses said controllable switch and a second controllable switch with a second diode which bypasses said switch is preferably used, wherein a series circuit composed of the capacitive energy store and an inductor is connected between a pole of the intermediate circuit and the connecting point of the two switches, and when one switch is open and a free-wheeling current is flowing through a diode the other switch is closed.

If a capacitive energy store which is composed of a plurality of capacitors is used, the voltage potential of the capacitors is measured individually on a periodic basis, and capacitors with an excessively increased voltage are at least partially discharged.

In the case of capacitors which are connected in series in the capacitive energy store, voltage balancing is preferably performed.

The arrangement according to the invention allows the electric energy flux to be significantly simplified in both directions, in other words for charging and discharging the capacitive energy store, by virtue of the fact that only a single switching regulator has to be arranged and said switching regulator functions both as a buck converter or step-down converter and as a boost converter or step-up converter.

The switching regulator of the energy converter is preferably a DC/DC converter having a step-down switching mode which reduces the output voltage compared to the input voltage, and a step-up switching mode which increases the output voltage compared to the input voltage, arranged, as mentioned, in a single power assembly.

The capacitive energy store is in practice in most cases a double layer capacitor, usually referred to as supercap for short, which comprises wound-on metal foils which are coated with carbon powder and have an intermediate separator and an electrolyte. When a plurality of capacitors are arranged, a distinction is made between a parallel connection with cumulative capacitances and a series connection with the reciprocal value of the cumulative reciprocal values of the capacitance of the individual capacitors. The series connection is applied, for example, in order to distribute a high voltage among the plurality of capacitors with a low dielectric strength. When a DC voltage is applied, current flows until the plates or foils are electrically charged and cannot absorb any further charge. An AC current has to be rectified for the time being in order to permanently charge the capacitor.

If the plates or foils of a charged capacitor are connected via an electric load, the charges of the plates or foils balance one another, i.e. an electric current flows until both poles are electrically neutral again.

In the context of the present invention, the capacitor must have sufficient capacitance to return the flap or the valve into the predefined safety position in the event of a voltage drop in the power supply or in the event of a power failure. For this reason, the previously customary arrangement of springs is functionally unnecessary.

The capacitor has to have a sufficiently high capacitance to return the actuator element into the safety position. For this reason, a double layer capacitor, referred to as supercap for short, is preferably used. Since the rated voltage of a supercap is usually low, the supply voltage has to be transformed to this voltage with an energy converter. When the supercap is discharged, the energy converter transforms the voltage back to the operating voltage of the electric motor.

According to one particularly advantageous embodiment of the invention, an energy store comprising one or more supercaps which are connected in parallel has a monitoring unit. An energy store with a plurality of supercaps which are connected in series has its own monitoring unit which also serves as a balancing unit between the supercaps. This prevents the voltage of a single supercap from becoming too large. This is achieved by discharging a supercap with an excessively high voltage. This also prevents excessively fast ageing.

The voltage regulator achieves a large voltage travel, preferably of approximately 20-40 V, in both directions, for the charging and discharging of the capacitive energy store, a capacitor which is also referred to in practice as a supercap.

An AC current at the input end, for example with a frequency of 50-60 Hz, is transformed into DC current and fed to the supercap via the switching regulator or energy converter.

The voltage potential of the supercaps is measured periodically on an individual basis with a balancing and monitoring unit. Supercaps with an excessively raised voltage are at least partially discharged. In the case of supercaps which are connected in series, a voltage balancing is also carried out here regularly.

BRIEF EXPLANATION OF THE FIGURES

The invention will be explained in more detail with reference to exemplary embodiments which are illustrated in the drawing. In said drawing.

WAYS OF CARRYING OUT THE INVENTION

Figure 1:
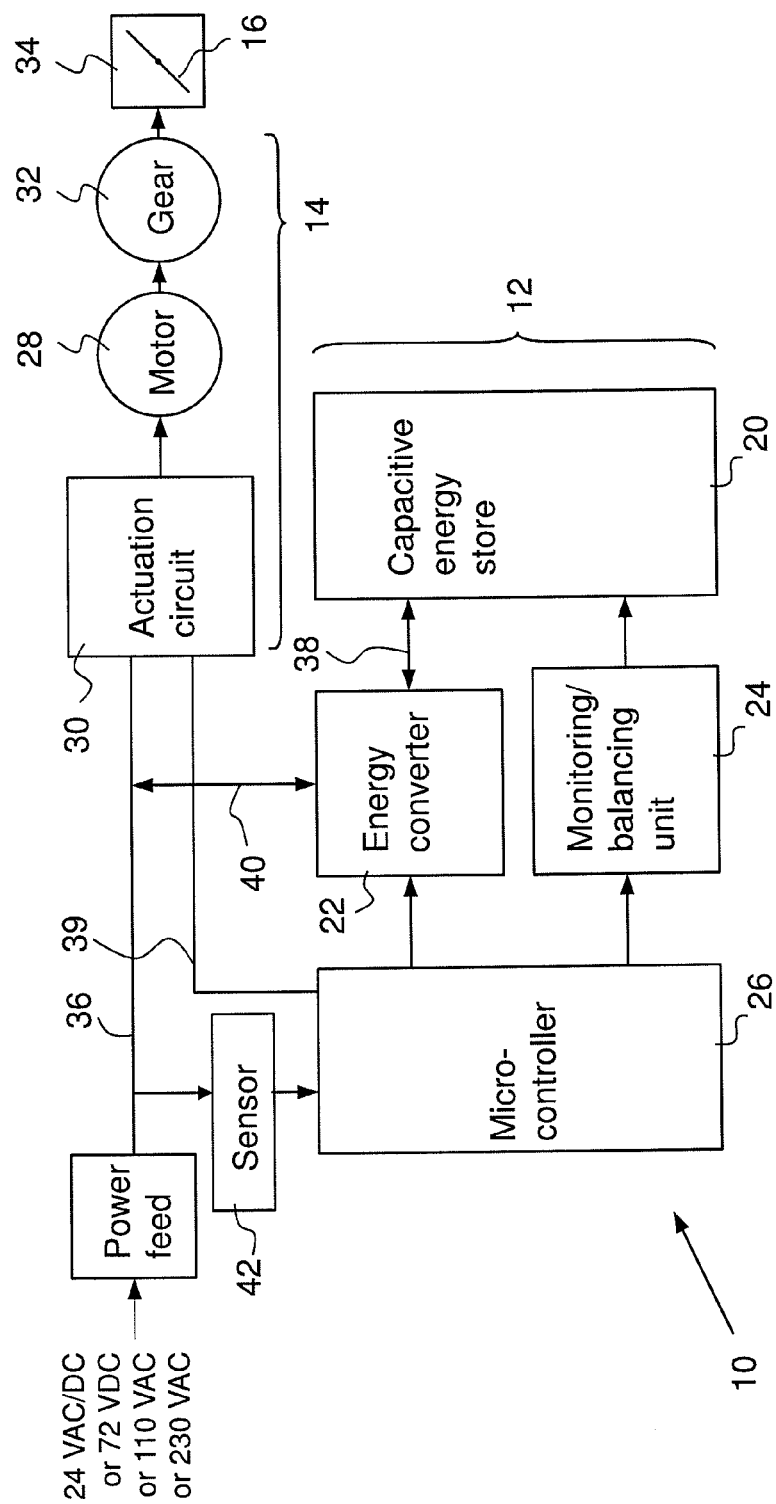
FIG. 1 is a block circuit diagram of a safety drive with a capacitive energy store (supercap)

FIG. 1 shows a safety drive 10 with a safety circuit 12, an actuator drive 14 with electric motor 28 for a flap 16, and a power feed 18.

The safety circuit 12 comprises a capacitive energy store 20, generally one or more double layer capacitors, usually referred to as supercap for the sake of simplicity. An energy converter 22 has an energy flux (44 in FIG. 2) in two directions. It lowers the voltage in order to charge the supercap 20 and increases it to the original value, specifically to the normal voltage of the electric motor 28, when the supercap 20 is discharged. A balancing and monitoring unit 24 serves, on the one hand, to monitor the capacitor or the individual capacitors of the energy store 20, and on the other hand serves to balance the voltage between different capacitors of the energy store 20. The details relating to the energy converter 22 and the balancing and monitoring unit 24 follow in FIGS. 2-6. The safety circuit 12 is controlled and monitored by a controller, the microcontroller 26, which also communicates the control commands to the actuator drive 14.

The actuator drive 14 comprises essentially an electric motor 28, here a sensorless and brushless DC motor. A motor ASIC (Application Specific Integrated Circuit) 30 receives the control commands of the microcontroller 26 via an MP bus 39 and controls the electric motor 28. This relatively low-power electric motor 28 transmits its torque, in the present example, via a step-down gearing 32 to a flap 16 in a ventilation pipe 34, or (not illustrated) to a valve or a linear rod.

The power feed 18 is itself supplied, for example, with a mains current 230 VAC or 110 VAC, or 24 VAC/DC or 72 VDC. At the output end of the power feed 18, an intermediate circuit voltage of 24 VDC here is applied to an intermediate circuit. In the normal operating mode, the electric motor 28 is supplied via the motor ASIC 30 by the power feed 18 which simultaneously charges the energy store 20 via the energy converter 22. Finally, the power feed 18 supplies the microcontroller 26 with the required operating current. The double arrows 38, 40 indicate that in the event of a current drop the energy store 20 is discharged via the same energy converter 22 as during charging, and the current in this emergency operating mode flows via the intermediate circuit 36 and the motor ASIC 30 to the electric motor 28 which moves the flap 16 into a predetermined safety position.

A voltage drop which triggers the emergency operating mode is detected by a sensor circuit 42 (see also FIG. 7) which passes a signal to the microcontroller 26. The latter in turn passes on the command to the motor ASIC 30 via an MP bus 39, a master slave connection. Said motor ASIC 30 actuates the electric motor 28 in order to reach the predetermined safety position of the flap 16. In this context, the electric motor 28 returns the flap 16 into the safety position with a parameterizable, usually higher speed.

In the normal operating mode, the energy store 20 is charged until the voltage is so high that sufficient energy is stored to return the actuator drive 14 into the predefined safety position. If the energy store 20 is overcharged in the normal operating mode, the energy store 20 is discharged.

Figure 1A:
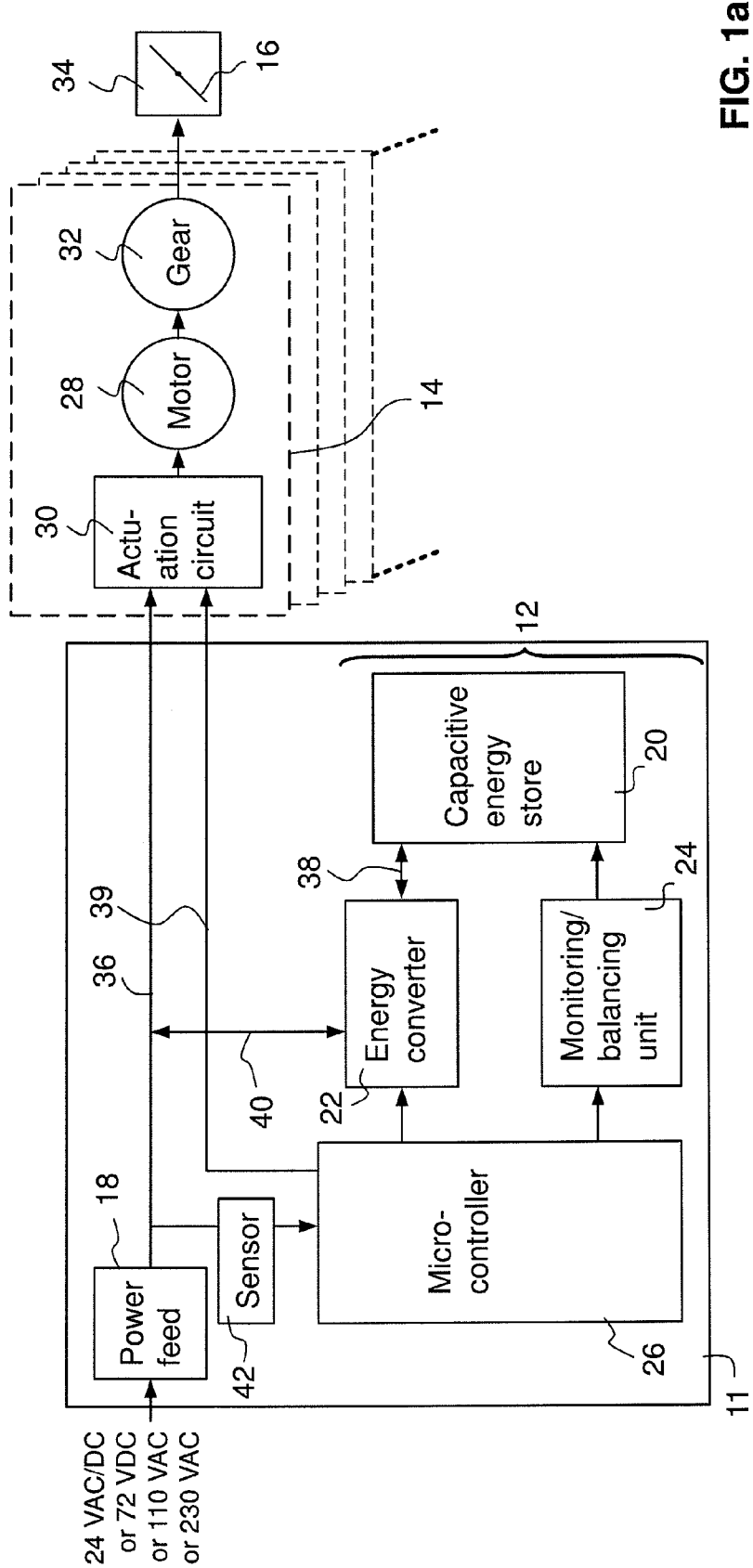
FIG. 1a is a block circuit diagram of a safety drive in which a common supply unit is provided for a plurality of actuating drives (up to 16)

While in the exemplary embodiment in FIG. 1 the actuator drive 14 and its energy supply form one unit with the power feed 18 and the safety circuit 12, the safety drive 10 according to FIG. 1a can also be divided into two independent blocks, specifically the supply unit 11 and the actuator drive 14, and these can then also be accommodated in separate housings, as indicated in FIG. 1a. The connection between the two blocks is then made by the intermediate circuit 36 and the MP bus 39. With such a configuration of the safety drive it is, in particular, possible to connect a plurality of actuator drives 14, for example up to 16, to a supply unit 11 and to supply them with the necessary energy and the necessary control commands from this common supply unit 11.

In one embodiment, the supply unit 11 can therefore be embodied as a separate device which comprises terminals and/or cable connections which are suitable for connection to one or more actuator drives 14 via the intermediate circuit 36 and the MP bus 39, for example one or more separate terminals or cable connections for connection via the intermediate circuit 36 and one or more separate terminals or cable connections for connection via the MP bus 39. The supply unit 11 also comprises a terminal for connection of the power feed 18 to an external power source.

Figure 2:
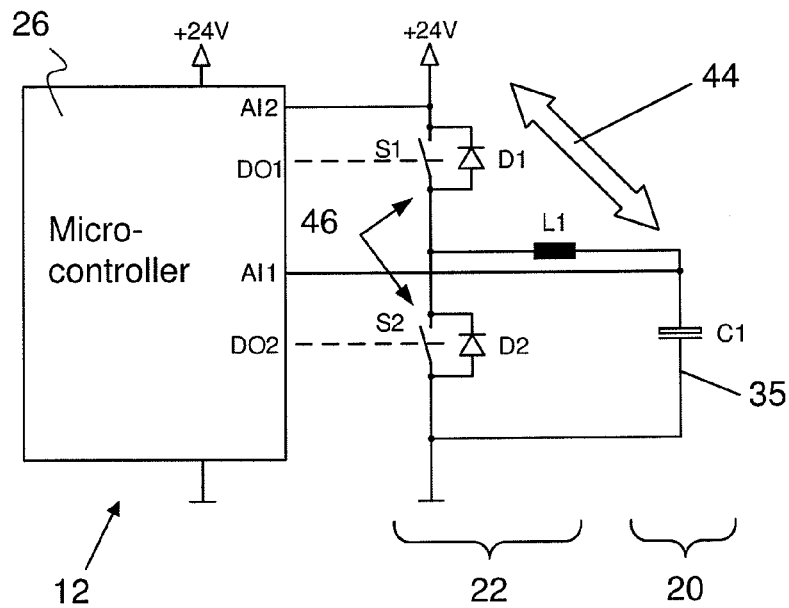
FIG. 2 shows a safety circuit with an energy converter.

FIG. 2 shows the energy converter 22 such as it is used in a safety circuit 12 according to FIG. 1, which energy store 22 permits an energy flux 44 in both directions with the same power assembly 46. In other words, the energy store 20 can be charged and discharged with the same power assembly 46. Both the energy converter 22 and the microcontroller 26 are connected to the intermediate circuit 36 with a voltage potential of 24 VDC.

The microcontroller 26 has an analog input AI1 which is connected between the energy store 20 (double layer capacitor C1) and an inductor L1 to the circuit 35 which leads via this capacitor, and an analog input $AI_2$ which is connected to the intermediate circuit 36 with the supply voltage. Furthermore, the microcontroller 26 has a first digital output DO1 which actuates a switch S1, and a second digital output DO2 which actuates a switch S2.

The two switches S1 and S2 of the power assembly 46 are connected in series and are bypassed in the blocking direction by one assigned diode D1, D2 each. The inductor L1 taps between the switches S1 and S2 and is connected to the energy store 20 (capacitor C1).

If FETs (Field Effect Transistors) are used as switches S1 and S2 (FET1 and FET2 in FIG. 7), the diodes D1 and D2 are preferably integrated in the FET. Additional diodes can be dispensed with in this case. When a free-wheeling current flows through a diode, it can be short circuited with the corresponding switch.

Figure 3:
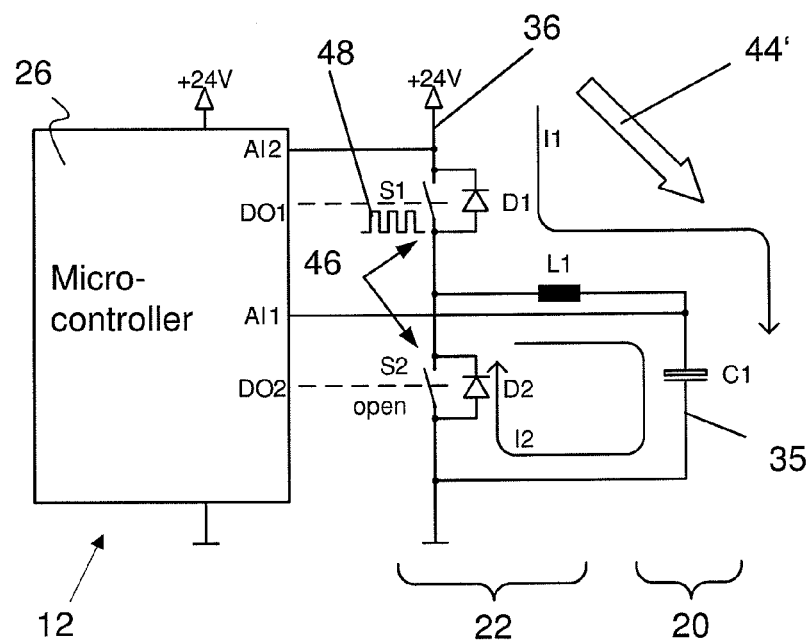
FIG. 3 shows a safety circuit with an energy converter according to FIG. 2 in the step-down mode.

FIG. 3 shows the safety circuit 12 with an energy converter 22 in the step-down mode (energy flux 44 from the intermediate circuit to the energy store 20). The energy converter 22 reduces the voltage of the intermediate circuit 36 here and charges the energy store 20 with its double layer capacitor C1. The microcontroller 26 measures the voltage across the capacitor C1 with the analog input AI1 and when necessary outputs a PWM signal 48 (pulse width modulation) from the digital output DO1 to the switch S1. If the switch S1 is closed, a current I1 flows through the inductor L1 and charges the capacitor C1. If the switch S1 is open, a free-wheeling current I2 flows through the diode D2 and the inductor L1, and the capacitor C1 is charged further. In the time in which the free-wheeling current I2 flows, the switch S2 can be additionally connected into the circuit in order to reduce the power losses at the diode D2. This increases the efficiency of the energy converter 22.

Figure 4:
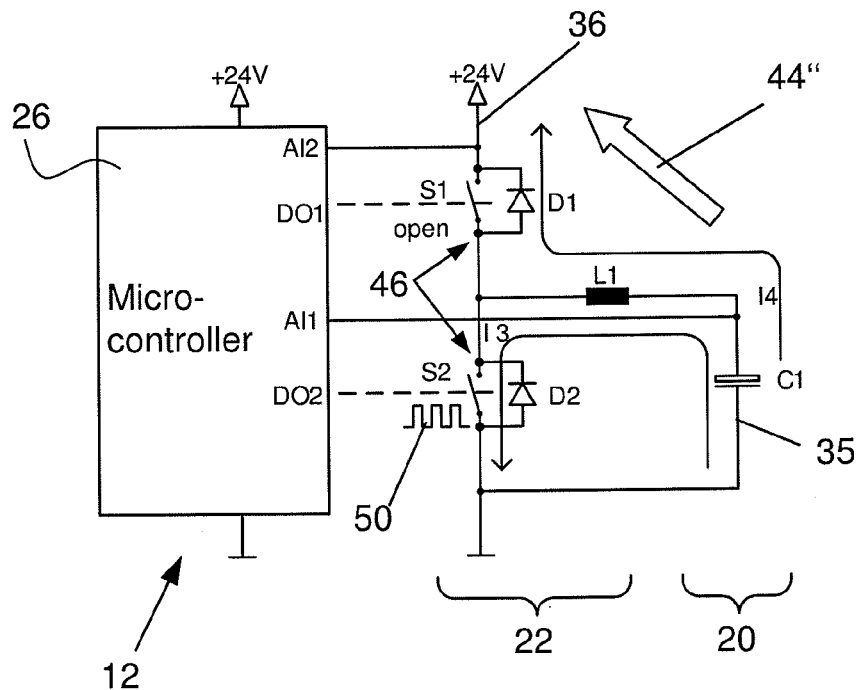
FIG. 4 shows a safety circuit with an energy converter according to FIG. 2 in the step-up mode.

FIG. 4 shows the energy converter 22 in the step-up mode (energy flux 44" from the energy store 20 to the electric motor 28). The energy converter 22 increases the voltage of the energy store 20 with a double layer capacitor C1 here, and feeds the energy into the intermediate circuit 36. The microcontroller 26 measures the voltage at the intermediate circuit 36 with the analog input AI2 and transmits a PWM signal 50 from the digital output DO2 to the switch S2. If the switch S2 is closed, a current I3 flows through the inductor L1 and discharges the capacitor C1. If the switch S2 is open, a free-wheeling current I4 flows through the diode D1 and the inductor L1, and the capacitor C1 is discharged further. The energy is converted from the capacitor C1 to 24 V and fed into the intermediate circuit 36. In the time in which a free-wheeling current I4 flows, the switch S1 can be additionally connected into the circuit in order to reduce the power losses at the diode D1. This increases the efficiency of the energy converter 22.

From FIGS. 2-4 it is apparent that the energy converter 22 with the same switching regulator 46 converts electrical energy to a lower voltage potential and then stores it in the energy store 20 (capacitor C1). If there is a power failure or a drop in voltage in the power supply 18, the stored energy is converted back and can supply the electric motor 28 (FIG. 1) with the same voltage as in the normal operating mode. The same power assembly 46 and the same energy converter 22 is always used for the step-down mode (FIG. 3) and the step-up mode (FIG. 4).

Figure 5:
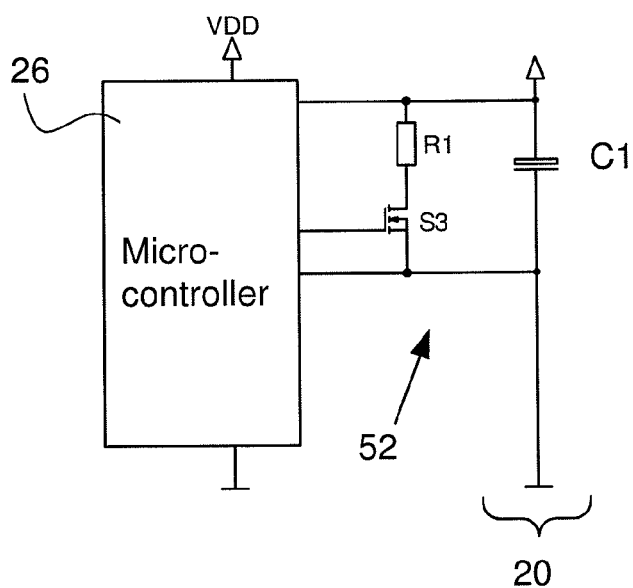
FIG. 5 shows a monitoring unit.

FIG. 5 illustrates a monitoring unit 52 which at least partially discharges the energy store 20 if the voltage across the capacitor C1 is higher than predefined. The energy store 20 with a double layer capacitor C1 has a bypass with a switch S3 and an ohmic resistor R1 which is connected in series. The discharge is carried out by closing the switch S3. In the process, a discharge current flows through R1 and S3.

Figure 6:
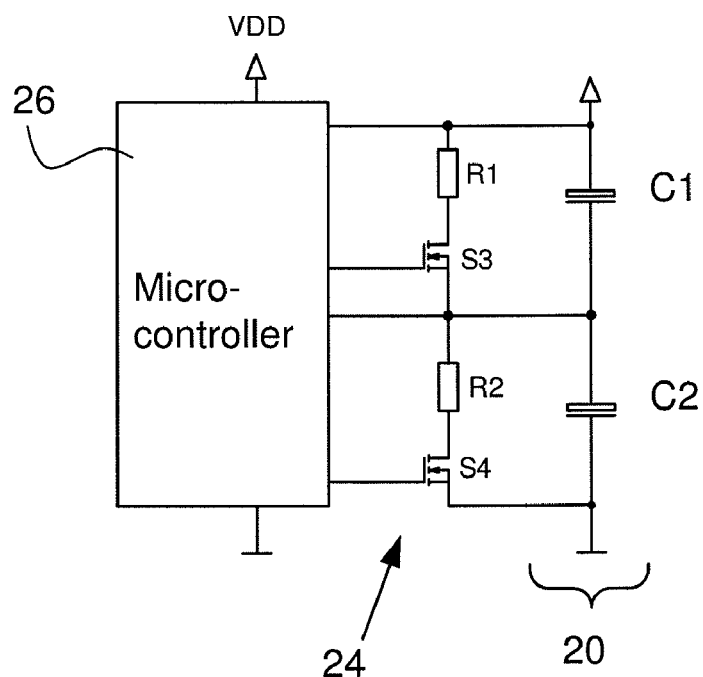
FIG. 6 shows a balancing and monitoring unit.

FIG. 6 shows an energy store with two double layer capacitors C1 and C2 which are connected in series. The capacitor C1 has, as in FIG. 5, a bypass with a switch S3 and an ohmic resistor R1. The capacitor C2 correspondingly has a bypass with a switch S4 and an ohmic resistor R2. If the capacitive energy converter 20 is composed of even more capacitors $C_1$, $C_2$, ..., Cn, each correspondingly has a switch Sn+2, and a resistor Rn. In other words, when capacitors C1 to Cn are connected in series each individual capacitor has its own monitoring unit 52.

If the voltage, for example across the capacitor C2, is higher than predefined, the capacitor C2 is at least partially discharged by closing the switch S4. The discharge current flows through the resistor R2 and the switch S4. If both switches S3 to SN+2 are closed simultaneously, a voltage balancing takes place across all the supercaps. If the total voltage from all the capacitors C1, C2, ..., Cn becomes too low, the entire capacitor packet is simply recharged.

From time to time, the functional capability of all the capacitors C1 to Cn, i.e. of the energy source 20, is checked individually. The capacitance C and the internal resistance ESR are measured. To do this, for example the switch S3 (FIG. 6) is closed for a short time. The capacitance C of the capacitor C1 can be determined by the resulting voltage difference before and after the discharge. If the voltage across the capacitor C1 is measured before and after the switching of S3, the internal resistance ESR can be calculated using the discharge resistor R1. The monitoring and balancing unit 24 therefore permits periodic state monitoring of the energy source 20 with the capacitors C1 to Cn.

In the normal operating mode, i.e. during charging and keeping the energy source 20 connected to a voltage, its capacitance is periodically checked. If one of the measured values provides a poor result, i.e. an excessively low capacitance or an excessively high internal resistance, the microcontroller transmits the command to the motor ASIC 30 to close the drive and to signal this fault, for example with an LED (56 in FIG. 7). The energy of this closing movement comes from the power feed and can easily be controlled in this way.

Figure 7:
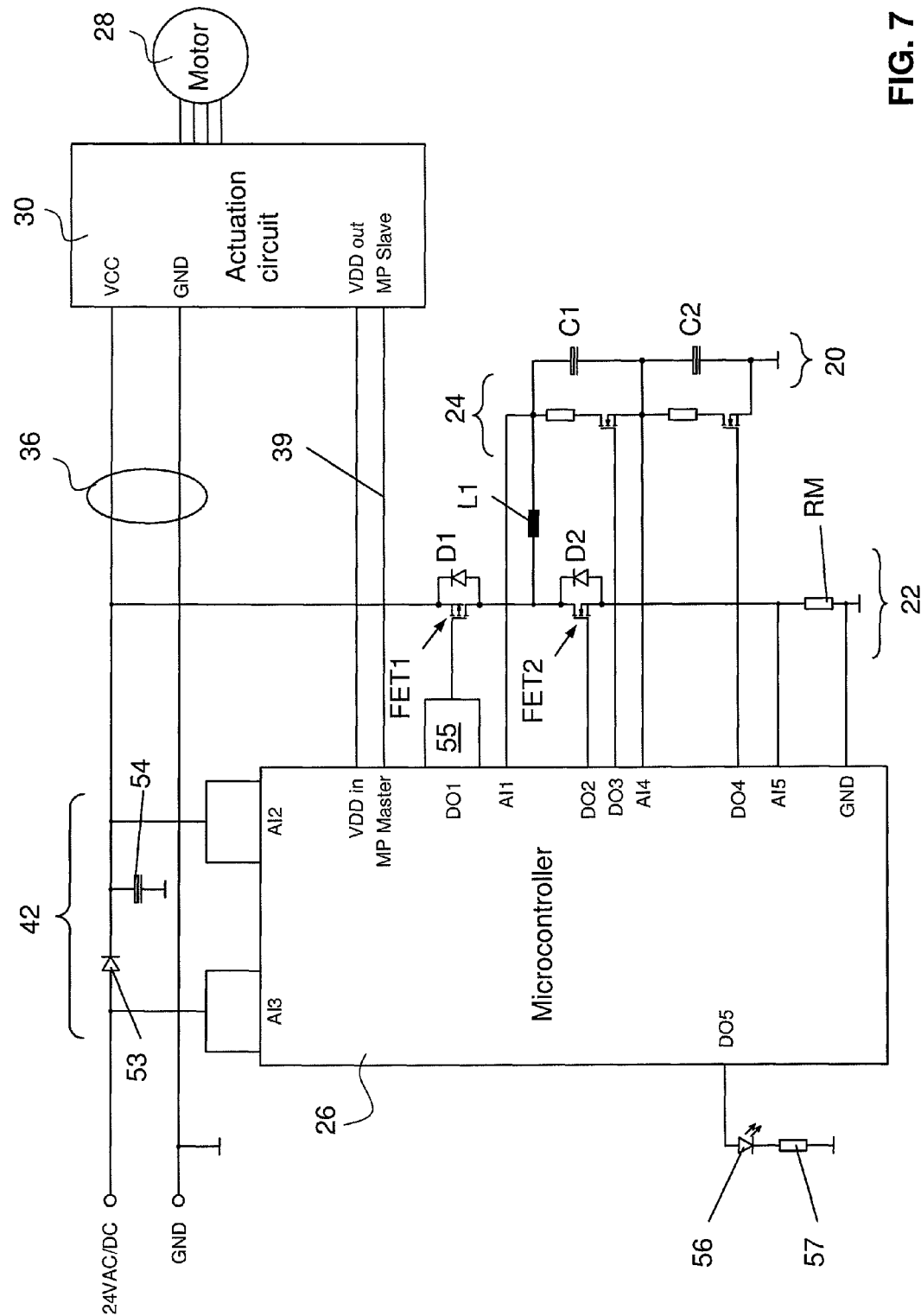
FIG. 7 shows a detailed circuit diagram of the safety drive from FIG. 1.

A detailed illustration of the safety drive 10 from FIG. 1 is given in FIG. 7. In the intermediate circuit 36, a diode 53 which has its polarity connected in the forward direction, and a capacitor 54 which is located downstream of the latter are arranged upstream of the energy converter 22. Said diode 53 and capacitor 54 both form a simple rectifier circuit. In the normal case, the diode 53 allows the current to pass from the feed side to the electric motor 28. The capacitor 54, which at the same time also has a smoothing function, is charged. If the voltage at the feed side falls or disappears entirely, a voltage drop to the level of the feed voltage (24 VDC) occurs at the diode 53 which is then switched off. This voltage drop is measured at the two analog inputs AI3 and AI2 of the microcontroller 26 and is conditioned in order to control the emergency operating mode. The two FET switches FET1 and FET2 are then actuated in the step-up mode (FIG. 4) and supply energy from the capacitive energy store 20 to the motor ASIC 30 or the electric motor 28 by reducing the voltage. The FET switch FET1 is actuated here from digital output DO1 of the microcontroller 26 via a level shifter 55, and the FET switch FET2 is actuated by the digital output DO2. The analog inputs AI1 and AI4 and the digital outputs DO3 and DO4 are assigned to the monitoring and balancing unit 24.

The analog input AI5 monitors the current flow in the energy converter 22 by means of a measuring resistor RM, while the digital output DO5 actuates a series circuit composed of an LED 56 and resistor 57, which LED can be used as a display for the operating state of the circuit.

In order to have an ageing process which is as short as possible for the supercaps (capacitors C1 and C2 in FIG. 7) which are used in the energy store 20, the voltage which is applied must be low. It is therefore possible, given a rated voltage of, for example, 2.7V, for a voltage of only 2.3V to be sufficient. After many years the capacitance should also be so high that sufficient energy can still be stored. That is to say too much energy is stored in the new state when the supercaps have still not aged and the capacitance is still high.

If the energy which is stored in the energy store 20 can be measured or determined in some other way, the supercaps can be operated with a much lower voltage than 2.3V, in particular at the start of their service life. As a result, the service life of the supercaps can be increased, or a higher energy level can be expected given the same service life.

Figure 7A:
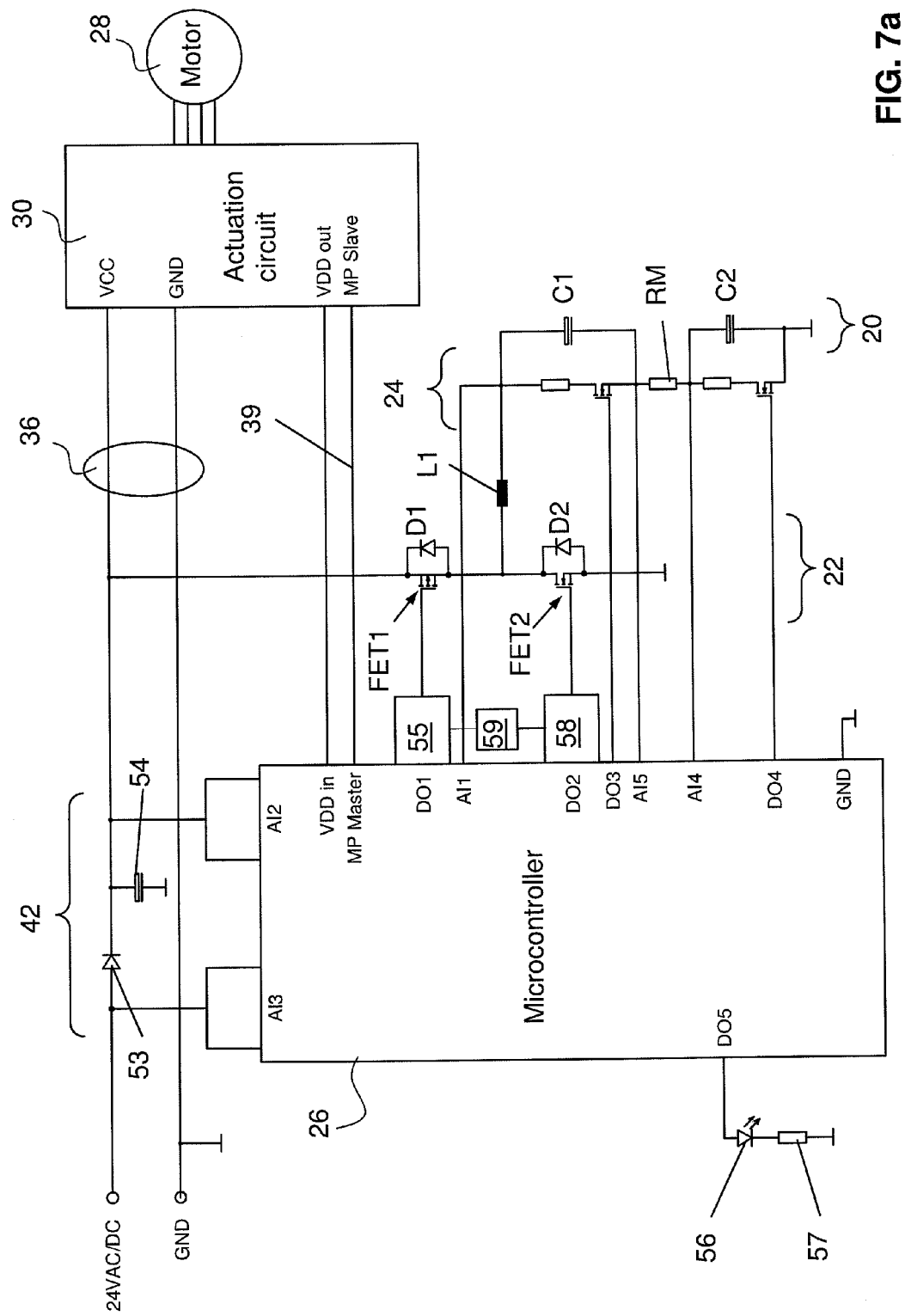
FIG. 7a shows the circuit diagram of a refinement of the safety drive which is an alternative to FIG. 7 and has an additional means of locking the power switch and direct monitoring of the charging and discharging current of the capacitors of the energy store.

In the variant of the circuit which is given in FIG. 7a and which differs from FIG. 7, the measuring resistor RM is relocated. It is now arranged between the two capacitors (supercaps) C1 and C2. This has the advantage that the charging and discharging current can be measured. On the one hand, it is therefore possible to monitor a maximum charging or discharging current. On the other hand, the energy which is charged into the supercaps or removed from them can be determined from this information, together with the voltage.

In FIG. 7a, the half bridge with the FET switches FET1 and FET2 operates again as asynchronous switching controller. There is the risk that in the event of a fault both switches will be closed and therefore a short-circuit current will flow. In the case of normal operation, the switch operation is controlled by a timer unit of the microcontroller 26, to be precise inclusive of the lag times during switching over so that the two switches FET1 and FET2 are never closed at the same time. However, in the starting phase or in the event of a fault it is conceivable that both actuation signals DO1 and DO2 will be switched on. A specific locking circuit 59 between a gate driver 58 for the switch FET2 and the level shifter 55, containing a gate driver, of the switch FET1 prevents this effectively.

LIST OF REFERENCE SYMBOLS

10 Safety drive
11 Supply unit
12 Safety circuit
14 Actuator drive
16 Flap
18 Power feed
20 Capacitive energy store
22 Energy converter
24 Monitoring and balancing unit
26 Microcontroller
28 Electric motor
30 Actuation circuit (motor ASIC)
32 Step down gear mechanism
34 Venting pipe
35 Circuit
36 Intermediate circuit (Intermediate circuit voltage)
38, 40 Double arrow (Energy flux)
39 MP bus
42 Sensor circuit
44,44',44" Energy flux
46 Power assembly (switching controller)
48 PWM signal
50 PWM signal
52 Monitoring unit
53 Diode
54 Capacitor
55 Level shifter (and gate driver)
56 LED
57 Resistor
58 Gate driver
59 Locking circuit
AI1, . . . ,AI5 Analog input
C1, . . . ,Cn Capacitor (double-layer capacitor or supercap)
D1,D2, . . . ,Dn Diode
DO1, . . . ,DO4 Digital output
FET1,FET2 FET switch
I1,I3 Current
I2,I4 Free-wheeling current
L1, Inductor
R1,R2, . . . Rn Resistor
RM Measuring resistor
S1,S2, . . . Sn+2 Switch

The invention claimed is:

1. A safety drive having a safety circuit for returning into a predefined safety position a flap or a valve for controlling a gas volume flow or fluid volume flow, the safety drive comprising:
    an actuator drive with a controllable electric motor;
    a power feed for the electric motor;
    an intermediate circuit connecting the electric motor to the power feed;
    a capacitive energy store; and
    an energy converter connected to the intermediate circuit and being operable as a DC/DC converter having a step-down switching mode in which the energy converter receives as its input voltage a voltage of the intermediate circuit and in which the energy converter provides a reduced output voltage to the capacitive energy store, and being operable in a step-up switching mode in which the energy converter receives as its input voltage a voltage of the capacitive energy store, and in which the energy converter provides an increased output voltage to the intermediate circuit,
    the energy converter comprising a first controllable switch with a first diode which bypasses said first controllable switch, and comprising a second controllable switch with a second diode which bypasses said second controllable switch, the first controllable switch and the second controllable switch being connected in series within the energy converter, and wherein a series circuit composed of the capacitive energy store and an inductor is connected between a pole of the intermediate circuit and the connecting point of the first and second controllable switches, the energy converter forming a controllable power assembly which either charges the capacitive energy store from the power feed or discharges said capacitive energy store into the electric motor in order to operate the electric motor.

2. The safety drive as claimed in claim 1, wherein the capacitive energy store comprises at least one double-layer capacitor or supercap.

3. The safety drive as claimed in claim 1, wherein the capacitive energy store comprises a capacitor.

4. The safety drive as claimed in claim 3, comprising a monitoring unit is assigned to the one capacitor.

5. The safety drive as claimed in claim 4, wherein the monitoring unit comprises a series circuit composed of a resistor and a controllable switch.

6. The safety drive as claimed in claim 1, wherein the capacitive energy store comprises a plurality of capacitors which are connected in parallel.

7. The safety drive as claimed in claim 6, comprising a monitoring unit which is assigned to the plurality of capacitors which are connected in parallel.

8. The safety drive as claimed in claim 7, wherein the monitoring unit comprises a series circuit composed of a resistor and a controllable switch.

9. The safety drive as claimed in claim 1, comprising an actuating circuit for actuating the electric motor, the actuating circuit being connected to a microcontroller via an MP bus.

10. The safety drive as claimed in claim 9, wherein the actuating circuit is in the form of a motor ASIC.

11. The safety drive as claimed in claim 1, wherein the intermediate circuit comprises a diode arranged to switch off current flow to the power feed when the capacitive energy store discharges into the electric motor.

12. The safety drive as claimed in claim 1, wherein the intermediate circuit comprises a sensor circuit which is designed to detect a voltage drop in the intermediate circuit.

13. The safety drive as claimed in claim 1, wherein the capacitive energy store comprises a plurality of capacitors which are connected in series, and wherein each said capacitor is assigned a monitoring and balancing unit, each monitoring and balancing unit comprising a bypass series circuit composed of a resistor and a controllable switch, each monitoring and balancing unit being configured to individually check the functional capability of said assigned capacitor by measuring the capacitance and the internal resistance of said capacitor.

14. A method for the assured return of a flap or of a valve for controlling a gas or fluid volume flow, into a predetermined position if a voltage failure or voltage drop occurs, with a safety drive having a safety circuit for returning into a predefined safety position a flap or a valve for controlling a gas volume flow or fluid volume flow, the safety drive comprising:
an actuator drive with a controllable electric motor;
a power feed for the electric motor;
a capacitive energy store; and
a controllable power assembly which either charges the capacitive energy store from the power feed or discharges said capacitive energy store into the electric motor in order to operate the electric motor, the power assembly comprising a first controllable switch and a first diode which by passes said first controllable switch, and comprising a second controllable switch with a second diode which by passes said second controllable switch, the first and second controllable switches being connected in series, wherein a series circuit of the capacitive energy store and an inductor is connected between a pole of the intermediate circuit and the connection point of the first and second controllable switches, the method comprising the steps of:
in normal operation, converting an electric current which also feeds the electric motor to a reduced voltage potential by means of the power assembly acting as an energy converter in a step-down mode; and storing electrical energy in the capacitive energy store, and
if a voltage drop occurs below a predetermined value or a voltage failure occurs, converting the electrical energy stored in the capacitive energy store back to an increased voltage potential by means of the same power assembly in a step-up mode, and the converted energy to operate the electric motor until the predefined safety position is reached.

15. The method as claimed in claim 14, wherein an alternating current of a frequency of preferably 50-60 Hz is transformed into direct current and is conducted via the power assembly to the capacitive energy store.

16. The method as claimed in claim 14, wherein the power assembly is operated with a voltage travel of at least approximately 20-40 V.

17. The method as claimed in claim 14, wherein in the step-down mode a microcontroller measures the voltage across the energy store with an analog input and outputs a PWM signal to the first controllable switch of the power assembly via a digital output.

18. The method as claimed in claim 14, wherein in the step-up mode a microcontroller measures the voltage at an intermediate circuit lying between power feed and electric motor with an analog input and outputs a PWM signal to a controllable switch of the power assembly via a digital output.

19. The method as claimed in claim 14, wherein the power assembly is operated in a manner that, while a free-wheeling current flows through one of the first and second diodes when the switch to which said diode is connected is open, the other of the first and second controllable switches is closed.

20. The method as claimed in claim 14. wherein a capacitive energy store comprising a plurality of capacitors is used, and wherein the voltage potential of the capacitors is measured periodically on an individual basis and capacitors with an excessively raised voltage are at least partially discharged.

21. The method as claimed in claim 20, wherein capacitors of the capacitive energy store are connected in series, and a voltage balancing is carried out.

22. A safety drive having a safety circuit for returning into a predefined safety position a flap or a valve for controlling a gas volume flow or fluid volume flow, the safety drive comprising:
an actuator drive with a controllable electric motor,
a power feed for the electric motor,
a capacitive energy store comprising at least one capacitor,
a controllable power assembly which either charges the capacitive energy store from the power feed or discharges said capacitive energy store into the electric motor in order to operate the electric motor, and
a monitoring unit which is assigned to said capacitor, the monitoring unit comprising a bypass series circuit composed of a resistor and a controllable switch, the monitoring unit being configured to individually check the functional capability of said capacitor by measuring the capacitance and the internal resistance of said capacitor.

23. The safety drive as claimed in claim 22, wherein the monitoring unit is operable to measure the capacitance and the internal resistance of said capacitor by carrying out the following steps:
closing said controllable switch for a short time to discharge said capacitor;
determining the voltage before and after switching of the controllable switch to calculate the internal resistance of the capacitor;
determining the voltage difference across the capacitor before and after the discharge to determine the capacitance of the capacitor.

24. The safety drive as claimed in claim 22, wherein the capacitive energy store comprises at least one double-layer capacitor or supercap.

25. The safety drive as claimed in claim 22, wherein the power assembly is part of an energy converter which is operable as a DC/DC converter having a step-down switching mode which reduces the output voltage compared to the input voltage, and a step-up switching mode which increases the output voltage compared to the input voltage of the energy store.

26. The safety drive as claimed in claim 25, wherein the power feed is connected to the electric motor via an intermediate circuit, the energy converter being connected to the intermediate circuit,
the energy converter comprising a first controllable switch with a first diode which bypasses said first controllable switch, and comprising a second controllable switch with a second diode which bypasses said second controllable switch, the first and second controllable switches being connected in series within the energy converter, and wherein a series circuit composed of the capacitive energy store and an inductor is connected between a pole of the intermediate circuit and the connecting point of the two switches.

27. The safety drive as claimed in claim 22, wherein the capacitive energy store comprises a plurality of capacitors which are connected in series.

28. The safety drive as claimed in claim 27, wherein each said capacitor is assigned a monitoring and balancing unit, each monitoring and balancing unit comprising a bypass series circuit composed of a resistor and a controllable switch, each monitoring and balancing unit being configured to individually check the functional capability of said assigned capacitor by measuring the capacitance and the internal resistance of said capacitor.

29. The safety device as claimed in claim 28, wherein the monitoring and balancing unit is operable to measure the capacitance and the internal resistance of said assigned capacitor by carrying out the following steps:
 closing said controllable switch for a short time to discharge said capacitor;
 determining the voltage before and after switching of the controllable switch to calculate the internal resistance of the capacitor; and
 determining the voltage difference across the capacitor before and after the discharge to determine the capacitance of the capacitor.

30. The safety drive as claimed in claim 22,
 wherein the power assembly is part of an energy converter which is operable as a DC/DC converter having a step-down switching mode which reduces the output voltage compared to the input voltage, and a step-up switching mode which increases the output voltage compared to the input voltage of the energy store,
 the safety drive further comprising a measuring resistor arranged in the energy converter to monitor the current flow in the energy converter.

31. The safety drive as claimed in claim 30, wherein the capacitive energy store comprises at least two capacitors which are connected in series, and wherein the measuring resistor is arranged between the two capacitors to enable measurement of charging and discharging currents.

32. The safety drive as claimed in claim 22, comprising:
 a supply unit forming a first independent block, the supply unit comprising:
  said power feed;
  said capacitive energy store comprising at least one capacitor; and
  a said controllable power assembly, and
 wherein said actuator drive forms with a controllable electric motor forming a second independent block, and
 wherein the supply unit and the actuator drive are connected via an intermediate circuit and an MP bus.

33. The safety drive as claimed in claim 32,
 wherein the actuator drive comprises an actuating circuit for actuating the electric motor,
 wherein the actuating circuit is connected to a microcontroller in the supply unit via said MP bus, and
 wherein the power feed is connected to the electric motor via said intermediate circuit.

34. The safety drive as claimed in claim 32, wherein the supply unit and the actuator drive are accommodated in separate housings.

35. The safety drive as claimed in claim 32, wherein the supply unit is connected to a plurality of actuator drives.

36. The safety drive as claimed in claim 32, wherein the supply unit comprises terminals and/or cable connections for connection to one or more actuator drives via the intermediate circuit and the MP bus.

37. The safety drive as claimed in claim 32, wherein the actuating circuit is in the form of a motor ASIC.

38. A method for the assured return of a flap or of a valve for controlling a gas or fluid volume flow, into a predetermined position if a voltage failure or voltage drop occurs, with a safety drive having a safety circuit, the safety drive comprising:
 an actuator drive with a controllable electric motor,
 a power feed for the electric motor,
 a capacitive energy store comprising at least one capacitor,
 a controllable power assembly which either charges the capacitive energy store from the power feed or discharges said capacitive energy store into the electric motor in order to operate the electric motor, and
 a monitoring unit which is assigned to said capacitor, the monitoring unit comprising a bypass series circuit composed of a resistor and a controllable switch, the monitoring unit being configured to individually check the functional capability of said capacitor by measuring the capacitance and the internal resistance of said capacitor,
 the method comprising:
 in normal operation, converting an electric current which also feeds the electric motor to a reduced voltage potential by means of the power assembly acting as an energy converter in a step-down mod; and storing electrical energy in the capacitive energy store,
 if a voltage drop occurs below a predetermined value or a voltage failure occurs, converting the electrical energy stored in the capacitive energy store back to an increased voltage potential by means of the same power assembly in a step-up mode, and using the converted energy to operate the electric motor until the predefined safety position is reached, and
 checking the functional capability of the at least one capacitor periodically and individually by measuring the capacitance and the internal resistance of said capacitor.

39. The method as claimed in claim 38, wherein the capacitance and the internal resistance of said capacitor are measured by carrying out the following steps:
 closing said controllable switch for a short time to discharge said capacitor;
 determining the voltage before and after switching of the controllable switch to calculate the internal resistance of the capacitor; and
 determining the voltage difference across the capacitor before and after the discharge to determine the capacitance of the capacitor.

40. The method as claimed in claim 38, wherein a capacitive energy store comprising a plurality of capacitors is used, and wherein the voltage potential of the capacitors is measured periodically on an individual basis and capacitors with an excessively raised voltage are at least partially discharged.

41. The method as claimed in claim 40, wherein capacitors of the capacitive energy store are connected in series, and wherein a voltage balancing is carried out.

* * * * *